(12) United States Patent
Suzuki et al.

(10) Patent No.: US 6,451,961 B2
(45) Date of Patent: Sep. 17, 2002

(54) ETHYLENIMINE POLYMER, AQUEOUS SOLUTION OF ETHYLENIMINE POLYMER, PRODUCTION PROCESS FOR THE SAME AND PURIFYING PROCESS THEREFOR

(75) Inventors: Seiichi Suzuki, Yokohama; Yoshiyuki Onda, Tokyo; Isao Satoh, Yokohama, all of (JP)

(73) Assignee: Nippon Shokubai Co Ltd, Osaka (JP)

( * ) Notice: Subject to any disclaimer, the term of this patent is extended or adjusted under 35 U.S.C. 154(b) by 0 days.

(21) Appl. No.: 09/771,704

(22) Filed: Jan. 30, 2001

(30) Foreign Application Priority Data

| Feb. 3, 2000 | (JP) | ........................ | 2000-026569 |
| Feb. 3, 2000 | (JP) | ........................ | 2000-026572 |
| Mar. 24, 2000 | (JP) | ........................ | 2000-083303 |
| Mar. 27, 2000 | (JP) | ........................ | 2000-085781 |

(51) Int. Cl.$^7$ ............................. G08G 73/04; C08F 6/10
(52) U.S. Cl. ....................... 528/424; 528/422
(58) Field of Search ................... 528/424, 422

(56) References Cited

U.S. PATENT DOCUMENTS

| 4,289,656 A | 9/1981 | Hayes et al. | ................ 252/470 |
| 4,337,175 A | 6/1982 | Ramirez | ................ 252/455 R |
| 4,477,591 A | 10/1984 | Ramirez | ..................... 502/340 |

FOREIGN PATENT DOCUMENTS

| JP | 241841967 | * 11/1967 |
| JP | 88281968 | 4/1968 |
| JP | 331201974 | 9/1974 |
| JP | 136991993 | 2/1993 |
| JP | 137001993 | 2/1993 |
| JP | 169051993 | 3/1993 |
| JP | 554981993 | 8/1993 |
| JP | 763431993 | 10/1993 |
| JP | 7634401993 | 10/1993 |
| JP | 873011993 | 12/1993 |
| JP | 1325641997 | 5/1997 |
| JP | 1944551997 | 7/1997 |
| JP | 5017572000 | 2/2000 |

* cited by examiner

Primary Examiner—P. Hampton-Hightower
(74) Attorney, Agent, or Firm—Sherman & Shalloway

(57) ABSTRACT

Provided are processes by which an ethylenimine polymer and an aqueous solution thereof can advantageously be produced at low costs in an industrial scale. The ethylenimine polymer can be produced by polymerizing crude ethylenimine obtained by a simple distilling operation from an ethylenimine-containing reaction mixture produced by subjecting ethanolamine to intermolecular dehydration reaction, preferably crude ethylenimine having impurity contents which are controlled in the specific ranges. When the above crude ethylenimine is polymerized in an aqueous medium, capable of being obtained is an aqueous solution of an ethylenimine polymer having a higher molecular weight than that produced by non-solvent polymerization. The ethylenimine polymer can be purified by, for example, adding water thereto, mixing them and then vaporizing and removing water under heating. The aqueous solution of an ethylenimine polymer can be purified by heating and condensing it.

8 Claims, No Drawings

ETHYLENIMINE POLYMER, AQUEOUS SOLUTION OF ETHYLENIMINE POLYMER, PRODUCTION PROCESS FOR THE SAME AND PURIFYING PROCESS THEREFOR

The present invention relates to an ethylenimine polymer, an aqueous solution of an ethylenimine polymer, a production process for the same and a purifying process therefor.

It is publicly known that monoethanolamine is subjected to intermolecular dehydration reaction in the presence of a catalyst to obtain ethylenimine. Known as the catalyst are, for example, tantalum base catalysts (U.S. Pat. Nos. 4,289,656, 4,337,175 and 4,477,591), silicon-alkaline metal and/or alkaline earth metal base catalysts (Japanese Patent Publications No. 13699/1993 and 13700/1993), phosphorus-alkaline metal and/or alkaline earth metal base catalysts (Japanese Patent Publications No. 76344/1993, 87301/1993, 76343/1993, 55498/1993 and 16905/1993), and catalysts prepared by carrying these silicon/phosphorus-alkaline metal/alkaline earth metal base catalyst compositions on molded ceramic carriers (Japanese Patents Laid-Opens No. 132564/1997 and 194455/1997).

A part of these catalysts is used for producing ethylenimine in an industrial scale, and an ethylenimine-containing reaction mixture obtained in this reaction is purified through a high degree purifying step and then used for synthesizing various ethylenimine polymers. To be specific, contained in an ethylenimine-containing reaction mixture obtained by intermolecular dehydration reaction of monoethanolamine are, in addition to intended ethylenimine, unreacted monoethanolamine; oligomers of ethylenimine; aldehydes such as acetaldehyde; heavy impurities such as a Schiff base produced by a reaction of acetaldehyde with monoethanolamine of the raw material; lower amines such as ammonia, methylamine and ethylamine; and acetonitrile. Accordingly, it is recognized that these impurities have to be removed from the above ethylenimine-containing reaction mixture through a high degree purifying step in order to obtain purified ethylenimine which can be used for polymerization reaction.

In conventional techniques, ethylenimine which is purified to such a high degree and therefore is expensive has to be used to produce an ethylenimine polymer, so that the production cost thereof can not be avoided from going up, and they are not necessarily industrially advantageous.

Accordingly, an object of the present invention is to provide an ethylenimine polymer which solves the problems described above on the conventional techniques and which is decreased in a production cost and industrially advantageous, and a production process for the same.

The present inventors have found that an ethylenimine polymer having a performance which is entirely equivalent to those of conventional ethylenimine polymers obtained by using purified ethylenimine for a raw material can be produced by polymerizing crude ethylenimine obtained by a simple distilling operation from an ethylenimine-containing reaction mixture produced by subjecting ethanolamine to intermolecular dehydration reaction, particularly crude ethylenimine having impurity contents which are controlled in specific ranges, and they have come to complete the present invention based on this knowledge.

Thus, according to the present invention, provided is an ethylenimine polymer characterized by being produced by polymerizing crude ethylenimine obtained by intermolecular dehydration reaction of monoethanolamine in the presence of a catalyst.

Further, according to the present invention, provided is a production process for an ethylenimine polymer characterized by subjecting monoethanolamine to intermolecular dehydration reaction in the presence of a catalyst to produce crude ethylenimine and then polymerizing this crude ethylenimine.

A process itself for producing an ethylenimine polymer by subjecting monoethanolamine to intermolecular dehydration reaction in the presence of a catalyst to produce an ethylenimine-containing reaction mixture shall not specifically be restricted and can be carried out by a usually well known process. To be specific, vaporized monoethanolamine is introduced into a catalyst layer as a raw material gas, if necessary, after suitably diluting this with inert gas such as nitrogen or after adding thereto ammonia, steam or hydrogen for the purpose to inhibit side reactions. The reaction pressure may be any of atmospheric pressure, reduced pressure and elevated pressure. The reaction temperature falls usually in a range of 300 to 500° C. A space velocity of the raw material gas is varied depending on a concentration of monoethanolamine and the kind of the catalyst used and therefore can not absolutely be specified, and it falls usually in a range of 50 to 5000 $h^{-1}$. The catalyst to be used shall not specifically be restricted as well, and the catalysts described in the above patent publications can be used. Among them, suitably used are catalysts described in Japanese Patent Publications No. 13699/1993, 13700/1993, 76344/1993, 87301/1993, 76343/1993, 55498/1993 and 16905/1993.

The ethylenimine-containing reaction mixture obtained by the gas phase intermolecular dehydration reaction described above is collected by means of a scavenger or condensed as it is and collected. An amine compound is suited as the scavenger, and particularly monoethanolamine is the most preferable since it is also the raw material. Mainly ethylenimine, unreacted monoethanolamine and moisture are contained in the ethylenimine-containing reaction mixture. Contained as by-products are lower amines such as ammonia, methylamine and ethylamine; acetonitrile; aldehydes such as acetaldehyde; Schiff bases produced by a reaction of acetaldehyde with monoethanolamine which is the raw material.

In the present invention, preferably produced is an ethylenimine polymer by polymerizing crude ethylenimine which is obtained by subjecting the ethylenimine-containing reaction mixture described above to a simple distilling operation and in which impurity contents are controlled in specific ranges. Such crude ethylenimine contains, for example, 90% by weight or more, preferably 95 to 99.9% by weight of ethylenimine, and as impurities, less than 1000 ppm (by weight), preferably less than 500 ppm of monoethanolamine, less than 2% by weight, preferably less than 1% by weight in total of lower amines comprising ammonia, methylamine and ethylamine, less than 2% by weight, preferably less than 1% by weight of acetonitrile and less than 1000 ppm (by weight) of water.

In addition to the above, the ethylenimine-containing reaction mixture is brought into contact with an organic solvent such as toluene and xylene to extract heavy matters contained in the reaction mixture, whereby such crude ethylenimine as described above can be obtained as well.

Crude ethylenimine having an ethylenimine content of smaller than 90% by weight and impurity contents exceeding the ranges described above causes the problem that an ethylenimine polymer obtained by polymerization thereof is inferior in performances, and therefore it is not preferred in the present invention.

In the present invention, such crude ethylenimine as described above is recovered from the ethylenimine-containing reaction mixture by a simple distilling operation or extracting operation, and then this crude ethylenimine is polymerized to produce an ethylenimine polymer.

A process for producing an ethylenimine polymer using crude ethylenimine shall not specifically be restricted, and it can be produced by a process usually used for producing an ethylenimine polymer. The polymerization catalyst and the polymerization conditions can suitably be selected from those usually used for polymerizing ethylenimine. For example, crude ethylenimine can be reacted in the presence of an effective amount of an acid catalyst, for example, hydrochloric acid at 0 to 200° C. (Japanese Patent Publication No. 33120/1074, Japanese Patent Publication (through PCT) No. 501757/2000 and the like). Further, crude ethylenimine may be addition-polymerized on the basis of an ethylenimine polymer. The ethylenimine polymer of the present invention includes an ethylenimine homopolymer and a copolymer of ethylenimine with a compound copolymerizable with ethylenimine, for example, amines. A production process for such ethylenimine polymers can be referred to Japanese Patent Publications No. 8828/1968 and 33120/1974.

The reaction system may be any of a batch system, a semi-batch system and a continuous flow system. In the case of a batch system, the polymer is increased in a viscosity in producing the polymer, and therefore a stirring blade for high viscosity, for example, a max blend blade (manufactured by Sumitomo Heavy Machine Ind. Co., Ltd.) is suitably used for heat removal, dispersion and acceleration of the reaction. Further, in order to make heat removal efficient, ethylenimine is suitably polymerized under refluxing of ethylenimine by means of a vertical tube type condenser.

Lower amines such as ammonia, methylamine and ethylamine and acetonitrile remain in a certain case in the ethylenimine polymer of the present invention obtained by polymerizing in the manner described above. These impurities exert adverse effects (generation of an offensive smell and a reduction in the stability) to a quality of the ethylenimine polymer and therefore are preferably removed as much as possible by a suitable purifying process.

Further, according to the present invention, such purifying process is provided as well. It is a process characterized by processing the ethylenimine polymer obtained by polymerizing crude ethylenimine by any of the following operations (A), (B) and (C), and the high purity ethylenimine polymer which meets a quality standard industrially required can be obtained by this process:

A: bubbling inert gas into the ethylenimine polymer B: adding water to the ethylenimine polymer, mixing them and then vaporizing and removing water under heating C: adding water to the ethylenimine polymer, mixing them and then vaporizing and removing water by heating while bubbling inert gas into the ethylenimine polymer.

The operation (A) comprises bubbling inert gas into the ethylenimine polymer. To be specific, inert gas is bubbled into the ethylenimine polymer in the reactor after finishing the polymerization reaction. Used as the inert gas is gas which is inert to amines, such as nitrogen gas, helium gas and argon gas, and nitrogen gas is suitably used from an economical point of view. A temperature of the polymer in bubbling does not have to exceed 200° C. and is held preferably in a range of 100 to 180° C. An amount of the inert gas is usually 0.01 to 10 Nl/min, preferably 0.1 to 2 Nl/min. The bubbling time is usually 0.5 to 100 hours, preferably 1 to 20 hours. The operation may be carried out either at atmospheric pressure or under reduced pressure, and when it is carried out under reduced pressure, the preferred pressure in the reactor is 10 to 700 mm Hg. The operation (A) provides the high-purity ethylenimine polymer in which all contents (B) of lower amines and acetonitrile are less than 1 ppm.

The operation (B) comprises adding water to the ethylenimine polymer, mixing them and then vaporizing and removing water under heating. To be specific, after finishing the polymerization reaction, water is added to the polymer in the reactor and mixed well, and then this mixture is heated to vaporize and remove water. An addition amount of water is usually 1 to 95%by weight, preferably 5 to 30% by weight based on the polymer. In vaporizing and removing water, a temperature of the polymer does not have to exceed 200° C. and is held preferably in a range of 100 to 150° C. The operation may be carried out either at atmospheric pressure or under reduced pressure, and when it is carried out under reduced pressure, the preferred pressure in the reactor is 10 to 700 mm Hg. The high-purity ethylenimine polymer in which all contents of lower amines and acetonitrile are less than 1 ppm is obtained by vaporizing and removing 15% by weight or more of water added.

The operation (C) comprises a combination of the operation (A) and the operation (B), and this can provide the high-purity ethylenimine polymer by shorter operating time. To be specific, after finishing the polymerization reaction, water is added to the polymer, and water is vaporized and removed from this mixture under heating while bubbling inert gas into this mixture.

The ethylenimine polymer obtained by subjecting ethylenimine to non-solvent polymerization in the presence of an acid catalyst has been described above. In the non-solvent polymerization method, however, it is difficult to obtain a polymer having a high molecular weight because of a problem on a viscosity. Accordingly, desired is a process for producing an ethylenimine polymer having a higher molecular weight. Proposed as one of such processes is a process for producing an aqueous solution of an ethylenimine polymer having a high molecular weight by polymerizing highly purified ethylenimine in an aqueous medium (Japanese Patent Publication No. 8828/1968). However, this process requires a high degree purifying step of ethylenimine and therefore can not be avoided from increasing in a production cost, so that it is not necessarily industrially advantageous.

The present inventors have found that the aqueous solution of the high molecular weight ethylenimine polymer having a performance which is entirely equivalent to those of conventional aqueous solutions of ethylenimine polymers obtained by polymerizing purified ethylenimine in an aqueous medium can be produced by polymerizing in an aqueous medium, crude ethylenimine obtained by a simple distilling operation from the ethylenimine-containing reaction mixture produced by subjecting ethanolamine to intermolecular dehydration reaction in the presence of a catalyst, particularly crude ethylenimine having impurity contents which are controlled in the specific ranges described above.

Thus, according to the present invention, provided is the aqueous solution of the ethylenimine polymer characterized by being produced by polymerizing in an aqueous medium, crude ethylenimine obtained by intermolecular dehydration reaction of monoethanolamine in the presence of a catalyst.

Further, according to the present invention, provided is a production process for an aqueous solution of an ethylenimine polymer characterized by subjecting monoethanolamine to intermolecular dehydration reaction in the presence of a catalyst to produce crude ethylenimine and then polymerizing this crude ethylenimine in an aqueous medium.

A process for polymerizing crude ethylenimine in an aqueous medium to produce the aqueous solution of the high molecular weight ethylenimine polymer shall not specifically be restricted, and it can be produced by a process usually used for producing an ethylenimine polymer in an aqueous medium. The polymerization catalyst and the polymerization conditions can suitably be selected from those usually used for polymerizing ethylenimine. To be specific, crude ethylenimine can be polymerized in an aqueous medium in the presence of a polyhaloalkane, for example, dichloroethane and dichloropropane (refer to Japanese Patent Publication No. 8828/1968). Or, crude ethylenimine may be polymerized with $\alpha,\beta$-unsaturated carboxylic acid or an ester thereof in an aqueous medium (refer to Japanese Patent Publication No. 24184/1967). Further, crude ethylenimine may be addition-polymerized based on an ethylenimine polymer.

Lower amines such as ammonia, methylamine and ethylamine and acetonitrile remain in a certain case in the aqueous solution of the high molecular weight ethylenimine polymer obtained by polymerizing in the manner described above. These impurities exert adverse effects (generation of an offensive smell and a reduction in the stability) to a quality of the ethylenimine polymer and therefore are preferably removed as much as possible by a suitable purifying process.

Further, according to the present invention, such purifying process is provided as well. It is a process comprising heating and condensing the aqueous solution of the high molecular weight ethylenimine polymer obtained in the manner described above. To be specific, taken is a means of heating and condensing the aqueous solution of the high molecular weight ethylenimine polymer while stirring at such a temperature that a temperature in the reactor does not exceed 200° C., preferably a temperature falling in a range of 100 to 180° C. after finishing the polymerization reaction. The degree of concentration of the aqueous solution shall not specifically be restricted, and the object can usually be achieved by vaporizing and removing not much more than 10 to 50% by weight of water contained in the aqueous solution of the ethylenimine polymer (the above aqueous solution comprises usually 20 to 50% by weight of the ethylenimine polymer and 80 to 50% by weight of water). The aqueous solution of the high molecular weight ethylenimine polymer having a high purity in which all contents of lower amines and acetonitrile are less than 1 ppm can be obtained by this method. The heating and condensing operation may be carried out either at atmospheric pressure or under reduced pressure, and when it is carried out under reduced pressure, the pressure in the reactor is preferably controlled to 10 to 700 mm Hg.

Various embodiments of the present invention have been explained above, and according to the present invention, the ethylenimine polymer having a weight average molecular weight of 1,000 to 1,000,000 (determined by gel permeation chromatography (GPC); reduced to pulran) can simply and readily be obtained even if any of the embodiments is employed. These ethylenimine polymers have a quality which meets industrial standards and therefore are widely used in the fields of, for example, a paper processing agent, an adhesive, a pressure sensitive agent, paint, ink, a fiber processing agent, a coagulating separator, cosmetics, toiletries and a dispersant.

The present invention shall more specifically be explained below with reference to examples. A series of Example I relates to a production of the ethylenimine polymer; a series of Example II relates to a purifying process of the ethylenimine polymer; a series of Example III relates to a production of the aqueous solution of the ethylenimine polymer; and a series of Example IV relates to a purifying process of the aqueous solution of the ethylenimine polymer. The units of ppm, % and parts in the respective examples are based on weight unless otherwise described.

EXAMPLE I-1
(Production of Crude Ethylenimine)

Dissolved in 2.4 liter of water was 900 g of aluminum sulfate (9 hydrates), and a solution prepared by dissolving 357.6 g of triammnium phosphate in 2.4 liter of water was added to this solution while stirring. The resulting precipitate was filtered and washed with water, and then it was kneaded well together with 73.6 g of barium oxide and 100 ml of water. The resulting clayish matter was molded into a pellet form having a major diameter of about 5 mm and a length of about 5 mm, and the pellets were dried and then baked at 1000° C. for 2 hours to obtain a catalyst having a composition of $Al_1P_1B_{0.2}$ in terms of an atomic ratio excluding oxygen.

A stainless steel-made reactor having a minor diameter of 25 mm was charged with one liter of this catalyst and heated to 430° C. by means of a heat transfer medium. Vaporized monoethanolamine was passed through this reactor under conditions of a pressure of 400 mm Hg at an outlet of the reactor and a space velocity of 1000 $h^{-1}$ to carry out continuous reaction. Reaction mixed gas produced by the reaction had a composition of 67.6 volume % of monoethanolamine, 12.7 volume % of ethylenimine, 15.6 volume % of water, 1.34 volume % of acetaldehyde and others of ammonia and dimers.

The reaction mixed gas was cooled down to 100° C. and then introduced into a stainless steel-made distilling tower having a minor diameter of 50 mm and a height of 2000 mm. The tower was charged with fillers (Macmafon packings) of 35 mm in a height of 1600 mm, and the reaction mixed liquid described above was introduced into a part having a height of ⅓ from an upper part of the charging tower. The liquid was distilled under a condition of a reflux ratio of 4 to obtain crude ethylenimine from the tower head.

This crude ethylenimine had the following contents of ethylenimine and impurities contained therein.

Ethylenimine: 98.5%

Monoethanolamine: 400 ppm

Lower amines in total: 9000 ppm

Methylamine: 1000 ppm

Ethylamine: 6000 ppm

Ammonia: 2000 ppm

Acetonitrile: 400 ppm

Water: 400 ppm

EXAMPLE I-2
(Production of Ethylenimine Polymer)

A reactor equipped with a stirrer, a reflux condenser and a thermometer was charged with 60 parts of ethylenediamine and 17 parts of 35% hydrochloric acid and heated. After elevating the temperature, 1140 parts of the crude ethylenimine described above was added thereto at 100 to 120° C. in 10 hours under refluxing. After finishing addition, the solution was ripened at 100 to 120° C. for 2 hours to complete the reaction, whereby an ethylenimine polymer (PEI-1) was obtained. After cooling down, a viscosity, a pH, a resin content and a weight average molecular weight of this PEI-1 were determined by the following methods. The results thereof are shown in Table 1.

Viscosity (mPa·s/25° C.): Determined by means of a B type viscometer.

pH: A 5% aqueous solution was prepared to determine a pH by means of a pH meter.

Resin content (%): The moisture was determined by a Karl Fisher method, and the balance was set as the resin content.

Weight average molecular weight: Pulran was used as a standard substance to determine the molecular weight by means of GPC.

EXAMPLE I-3
(Production of Ethylenimine Polymer)

A reactor equipped with a stirrer, a reflux condenser and a thermometer was charged with 72 parts of PEI-1 obtained in Example I-2 and 17 parts of 35% hydrochloric acid and heated. After elevating the temperature, 1128 parts of the crude ethylenimine obtained in Example I-1 was added thereto at 100 to 120° C. in 10 hours under refluxing. After finishing addition, the solution was ripened at 100 to 120° C. for 2 hours to complete the reaction, whereby an ethylenimine polymer (PEI-2) was obtained. After cooling down, a viscosity, a pH, a resin content and a weight average molecular weight of this PEI-2 were determined in the same manners as in Example I-2. The results thereof are shown in Table 1.

TABLE 1

| Example | Viscosity (mPa · s/25° C.) | pH (5% aqueous solution) | Resin content (mass %) | Weight average molecular weight |
|---------|---------------------------|--------------------------|------------------------|---------------------------------|
| I-2 (PEI-1) | 6150 | 11.1 | 99.7 | 3610 |
| I-3 (PEI-2) | 86600 | 11.3 | 99.8 | 16560 |

EXAMPLE II-1
(Production of Crude Ethylenimine)

Ethylenimine was produced according to a method described in Example 1 of Japanese Patent Publication No. 55498/1993. That is, monoethanolamine was continuously introduced into a reactor and subjected to gas phase intermolecular dehydration reaction in the presence of a phosphorus-alkaline earth metal base catalyst under conditions of a temperature of 430° C., a reduced pressure of 400 mm Hg and a space velocity of 1000 h$^{-1}$. The reaction mixture was cooled down to 100° C. at an outlet of the reactor and condensed, and the condensate was introduced into a continuous distilling tower to obtain crude ethylenimine distilled from the tower head. Contained in this crude ethylenimine were 1000 ppm of methylamine, 6000 ppm of ethylamine, 400 ppm of acetonitrile and 400 ppm of water.

EXAMPLE II-2
(Production of Ethylenimine Polymer)

A reactor equipped with a stirrer, a reflux condenser and a thermometer was charged with 60 parts of ethylenediamine and 17 parts of 35% hydrochloric acid and heated. After elevating the temperature, 1140 parts of the crude ethylenimine obtained in Example 11-1 was added thereto at 100 to 120° C. in 10 hours under refluxing. After finishing addition, the solution was ripened at 100 to 120° C. for 2 hours to complete the reaction. The ethylenimine polymer thus obtained had a weight average molecular weight of 3610 (determined by gel permeation chromatography (GPC); reduced to pulran) and a viscosity of 6150 (mPa·s/ 25° C.; B type viscometer). Contained in the ethylenimine polymer were 400 ppm of acetonitrile and 2000 ppm of lower amines such as ammonia.

EXAMPLE II-3
(Purifying of Ethylenimine Polymer)

A flask of 2 liter put on an oil bath was charged with 1 kg of the ethylenimine polymer obtained in Example 11-2, and nitrogen gas was bubbled into the polymer at a rate of 0.2 Nl/min at an atmospheric pressure. A temperature of the polymer was maintained at 120° C. while bubbling. After bubbling for 5 hours, the polymer was analyzed to find that both contents of acetonitrile and lower amines were 1 ppm or less.

EXAMPLE II-4
(Purifying of Ethylenimine Polymer)

After adding 0.2 kg of water to 1 kg of the ethylenimine polymer obtained in Example II-2, it was charged into a flask of 2 liter put on an oil bath and heated at an atmospheric pressure under nitrogen atmosphere to vaporize and remove water. The temperature of the oil bath was maintained at 105° C. during this operation. After heated and vaporized for 10 hours, the polymer was analyzed to find that both contents of acetonitrile and lower amines were 1 ppm or less and the water content was 14%.

EXAMPLE II-5
(Purifying of Ethylenimine Polymer)

After adding 0.2 kg of water to 1 kg of the ethylenimine polymer obtained in Example II-2, it was charged into a flask of 2 liter put on an oil bath and heated while bubbling nitrogen gas into the polymer at a rate of 0.2 Nl/min at an atmospheric pressure to vaporize and remove water. The temperature of the oil bath was maintained at 105° C. during this operation. After heated and bubbled for 8 hours, the polymer was analyzed to find that both contents of acetonitrile lower amines were 1 ppm or less and the water content was 14%.

EXAMPLE II-6
(Purifying of Ethylenimine Polymer)

After adding 0.2 kg of water to 1 kg of the ethylenimine polymer obtained in Example II-2, it was charged into a flask of 2 liter put on an oil bath, and nitrogen gas was bubbled into the polymer at a rate of 0.2 Nl/min at an atmospheric pressure. The polymer mixture was slowly heated from 90° C. up to 127° C. in 3 hours to vaporize and remove water. After heated and bubbled for 3 hours, the polymer was analyzed to find that both contents of acetonitrile and lower amines were 1 ppm or less and the water content was 10%.

EXAMPLE III-1
(Production of Crude Ethylenimine)

Dissolved in 2.4 liter of water was 900 g of aluminum sulfate (9 hydrates), and a solution prepared by dissolving 357.6 g of triammnium phosphate in 2.4 liter of water was added to this solution while stirring. The resulting precipitate was filtered and washed with water and then, it was kneaded well together with 73.6 g of barium oxide and 100 ml of water. The resulting clayish matter was molded into a pellet form having a major diameter of about 5 mm and a length of about 5 mm, and the pellets were dried and then baked at 1000° C. for 2 hours to obtain a catalyst having a composition of $Al_1P_1B_{0.2}$ in terms of an atomic ratio excluding oxygen.

A stainless steel-made reactor having a minor diameter of 25 mm was charged with one liter of this catalyst and heated to 430° C. by means of a heat transfer medium. Vaporized monoethanolamine was passed through this reactor under conditions of a pressure of 400 mm Hg at an outlet of the reactor and a space velocity of 1000 h$^{-1}$ to carry out continuous reaction. Reaction mixed gas produced by the reaction had a composition of 67.6 volume % of monoethanolamine, 12.7 volume % of ethylenimine, 15.6 volume % of water, 1.34 volume % of acetaldehyde, and the others were ammonia and dimers.

The reaction mixed gas described above was cooled down to 100° C. and then introduced into a stainless steel-made distilling tower having a minor diameter of 50 mm and a height of 2000 mm. The tower was charged with fillers (Macmafon packings) of 6.35 mm in a height of 1600 mm, and the reaction mixed liquid described above was introduced into a part having a height of ⅓ from an upper part of the charging tower. The liquid was distilled under a condition of a reflux ratio of 4 to obtain crude ethylenimine from the tower head.

This crude ethylenimine had the following contents of ethylenimine and impurities contained therein.

Ethylenimine: 98.5%

Monoethanolamine: 400 ppm

Lower amines in total: 9000 ppm

Methylamine: 1000 ppm

Ethylamine: 6000 ppm

Ammonia: 2000 ppm

Acetonitrile: 400 ppm

Water: 400 ppm

EXAMPLE III-2
(Production of Aqueous Solution of Ethylenimine Polymer)

A reactor equipped with a stirrer, a reflux condenser and a thermometer was charged with 700 parts of water and 10 parts of 1,2-dichloroethane and heated. After elevating the temperature, 300 parts of the crude ethylenimine obtained in Example III-1 was added thereto at 80° C. in 4 hours. After finishing addition, the solution was ripened at 80° C. for 3 hours to complete the reaction, whereby an aqueous solution of an ethylenimine polymer was obtained. After cooling down, a viscosity, a pH, a resin content and a weight average molecular weight of the aqueous solution of the ethylenimine polymer were determined by the following methods. The results thereof are shown in Table 2.

Viscosity (mPa·s/25° C.): Determined by means of a B type viscometer.

pH: A 5% aqueous solution was prepared to determine a pH by means of a pH meter.

Resin content (%): The solution was dried at 150° C. for one hour by means of a hot air dryer, and the balance was set as the resin content.

Weight average molecular weight: Pulran was used as a standard substance to determine the molecular weight by means of GPC.

TABLE 2

| Example | Viscosity (mPa · s/25° C.) | pH (5% aqueous solution) | Resin content (mass %) | Weight average molecular weight |
|---|---|---|---|---|
| III-2 | 275 | 10.8 | 30.2 | 121780 |

EXAMPLE IV-1
(Production of Aqueous Solution of Ethylenimine Polymer)

A flask reactor of 2 liter equipped with a stirrer, a reflux condenser and a thermometer was charged with 700 parts of water and 10 parts of 1,2-dichloroethane and heated. After elevating the temperature, 300 parts of the crude ethylenimine obtained in Example II-1 described above was added thereto at 80° C. in 4 hours. After finishing addition, the solution was ripened at 80° C. for 3 hours to complete the reaction. The aqueous solution of the ethylenimine polymer thus obtained was analyzed, to result in finding that the polymer had a weight average molecular weight of 121,780 (determined by gel permeation chromatography (GPC); reduced to pulran) and a viscosity of 275 (mPa·s/25° C.; B type viscometer) and that the impurity contents were 160 ppm of acetonitrile and 800 ppm of lower amines such as ammonia.

EXAMPLE IV-2
(Purifying of Aqueous Solution of Ethylenimine Polymer)

A flask reactor equipped with a stirrer, an steam-condensing and drawing device and a thermometer which was put on an oil bath was charged with 1000 g of the aqueous solution of the ethylenimine polymer obtained in Example IV-1 and heated at 110° C. at an atmospheric pressure. Distilled water was cut, and when the resin content became 35%, the solution was analyzed. As a result thereof, it was found that acetonitrile had a content of 0.9 ppm and lower amines had a content of 2.0 ppm. Vaporization was further accelerated to condense the solution, and when the resin content reached 40%, the solution was analyzed to result in finding that both of the contents of acetonitrile and lower amines were 1 ppm or less.

What is claimed is:

1. An ethylenimine polymer produced by polymerizing crude ethylenimine obtained by intermolecular dehydration reaction of monoethanolamine in the presence of a catalyst.

2. The ethylenimine polymer as claimed in claim 1, wherein the above crude ethylenimine contains at least 90% by weight of ethylenimine, and as impurities, less than 1000 ppm (by weight) of monoethanolamine, less than 2% by weight in total of lower amines comprising ammonia, methylamine and ethylamine, less than 2% by weight of acetonitrile and less than 1000 ppm (by weight) of water.

3. A production process for the ethylenimine polymer as claimed in claim 1 or 2, comprising subjecting monoethanolamine to intermolecular dehydration reaction in the presence of a catalyst to produce crude ethylenimine and then polymerizing this crude ethylenimine.

4. A process for purifying the ethylenimine polymer produced by the process as claimed in claim 3, characterized by:

(A) bubbling inert gas into the above ethylenimine polymer, (B) adding water to the ethylenimine polymer, mixing them and then vaporizing and removing water under heating, or (C) adding water to the ethylenimine polymer, mixing them and then vaporizing and removing water by heating while bubbling inert gas into the ethylenimine polymer.

5. An ethylenimine polymer aqueous solution produced by polymerizing in an aqueous medium, crude ethylenimine obtained by the intermolecular dehydration reaction of monoethanolamine in the presence of a catalyst.

6. The ethylenimine polymer aqueous solution as claimed in claim 5, wherein the above crude ethylenimine contains at least 90% by weight of ethylenimine, and as impurities, less than 1000 ppm (by weight) of monoethanolamine, less than 2% by weight in total of lower amines comprising ammonia, methylamine and ethylamine, less than 2% by weight of acetonitrile and less than 1000 ppm (by weight) of water.

7. A production process for the ethylenimine polymer aqueous solution as claimed in claim 5 or 6, comprising subjecting monoethanolamine to intermolecular dehydration reaction in the presence of a catalyst to produce crude ethylenimine and then polymerizing this crude ethylenimine in an aqueous medium.

8. A process for purifying the ethylenimine polymer aqueous solution produced by the process as claimed in claim 7, characterized by heating and condensing the above aqueous solution.

* * * * *